United States Patent [19]

Priem

[11] Patent Number: 5,733,194
[45] Date of Patent: Mar. 31, 1998

[54] APPARATUS FOR PROVIDING IMPROVED GAME PORT OPERATION IN A COMPUTER

[75] Inventor: Curtis Priem, Fremont, Calif.

[73] Assignee: Nvidia Corporation, Sunnyvale, Calif.

[21] Appl. No.: 422,995

[22] Filed: Apr. 14, 1995

[51] Int. Cl.[6] ........................................... A63F 9/24
[52] U.S. Cl. .......................... 463/36; 273/148 B
[58] Field of Search ..................... 273/148 B, 438; 345/161; 341/164, 165, 166, 172; 364/200 MS File, 900 MS File; 463/36

[56] References Cited

U.S. PATENT DOCUMENTS

| | | |
|---|---|---|
| 4,467,412 | 8/1984 | Hoff . |
| 4,589,089 | 5/1986 | Frederiksen . |
| 4,829,473 | 5/1989 | Keller et al. . |
| 4,868,780 | 9/1989 | Stern ................................ 345/161 X |
| 5,230,059 | 7/1993 | Nielsen et al. . |
| 5,389,950 | 2/1995 | Bouton ............................. 345/161 X |

*Primary Examiner*—Jessica Harrison
*Assistant Examiner*—Michael O'Neill
*Attorney, Agent, or Firm*—Stephen L. King

[57] ABSTRACT

An arrangement which provides hardware at the game port to provide a direct analog-to-digital conversion of input signals provided by the directional input signals of a joystick without involving the central processing unit in the determination. By determining at the game port the input values, the central processing unit need not have its interrupts disabled, and games may easily function with other application programs in a multi-tasking operating system.

12 Claims, 2 Drawing Sheets

APPARATUS FOR PROVIDING IMPROVED GAME PORT OPERATION IN A COMPUTER

BACKGROUND OF THE INVENTION

1. Field of the Invention

This invention relates to computer systems and, more particularly, to methods and apparatus for improving the ability of computer systems to respond to the input values provided at a game port.

2. History of the Prior Art

One of the earliest uses of the personal computer was to play games. In order to allow the computer to play various games, the keys of the keyboard were assigned to provide input signals. Although some users are able to key in values rapidly, the speed at which games could be played and thus the games which could be played were limited by this mode of input. In order to allow more rapid input so that games such as flight simulators could be easily played, joysticks were devised.

A joystick is typically a control handle similar to the original airplane joystick which is positioned vertically to move about its base in any direction. Such movement causes the value of a pair of resistors, each representing an opposing two of the four quadrants, to vary. Thus, pushing the joystick directly forward may cause a resistor representing North and South to reduce in value. Pulling the joystick directly backward may have the opposite effect. In like manner, moving the stick directly to the left may cause a resistor representing East and West to reduce in value. These values are furnished simultaneously to the game software and together determine the movement of the cursor (center of action) with respect to the remainder of the display. Other signals may also be generated by a joystick, but these are typically binary off/on values. Typically, a game port has a total of eight input signal ports, four of which receive the directional signals and four of which receive the binary signals generated by a pair of joysticks.

The directional signals provided by joysticks are not direct measurements of the values of the variable resistors. Instead, the game port of personal computers utilizes an input current furnished for each directional signal through the associated variable resistor when a known voltage is provided across the variable resistor. This current is used to charge a capacitor for that signal. While the capacitor is charging, the central processing unit (CPU) of the computer runs a loop process continuously to measure the time required to charge the capacitor. When the capacitor has charged to some predetermined voltage, a signal is generated which is detected by the CPU to end the timing loop. The time required to charge the capacitor to the predetermined voltage is measured by the CPU counting the iterations of the software timing loop. The time is a direct representation of the resistance and thus of the movement in one direction of the position of the joystick. This takes place for each directional input supplied by the joystick. Typically, there are two joysticks so a total of four capacitive timing circuits are required. This method of counting through a timing loop is a singularly slow manner of determining a resistance value. Moreover, since four directional inputs are provided, four directional outputs of the joysticks must be monitored by the CPU timing loops. This technique requires that the CPU constantly monitor the directional inputs of the game port while any timing loop is running in order to receive the input signals from the joystick. To do this, the CPU must disable all interrupts. The result is that games cannot typically be run with a multiprocessing operating system. All other programs must be disabled. This means that games (or other application programs using the game port) cannot without a good deal of difficulty be run in the modern operating systems which provide substantial graphical assistance but require that interrupts be constantly utilized.

It would be advantageous to provide apparatus and a method by which games could be allowed to operate with modern multiprocessing operating systems easily and without otherwise burdening the system.

SUMMARY OF THE INVENTION

It is, therefore, an object of the present invention to provide improved game port circuitry which may be conveniently utilized with any of the modern operating systems.

It is another object of the present invention to provide improved game port circuitry which does not require the constant attention of the central processing unit of a computer system during the period it is in use.

It is yet another object of the present invention to provide a new method for measuring the value of resistances used by a joystick to indicate changes in input values.

It is an additional object of the present invention to provide improved game port circuitry which does not require the constant attention of the central processing unit of a computer system during the period it is in use yet is still adapted to run with software requiring the constant attention of the central processing unit of a computer system.

These and other objects of the present invention are realized in an arrangement which provides hardware at the game port to furnish output signals which represent the directional input signals provided by a joystick and provides an analog-to-digital conversion of those output signals which may be transferred to main memory without involving the CPU in the determination. By determining the digital values of the directional input signals at the game port, the CPU need not disable its interrupts in order to utilize the game port; and games may easily function with other processes in a multi-tasking operating system.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
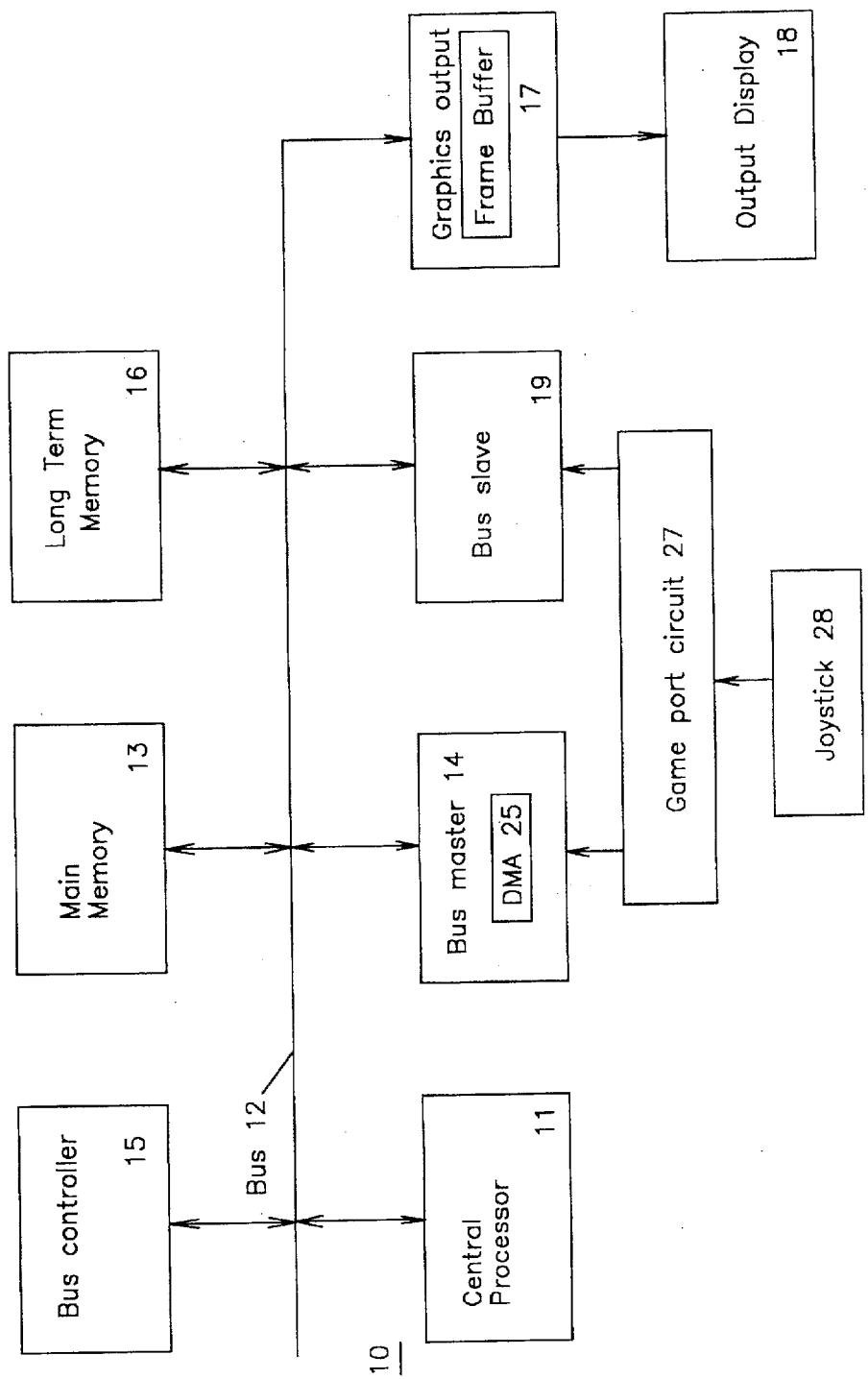
FIG. 1 is a block diagram of a computer system which may utilize the present invention.

Referring now to FIG. 1, there is illustrated a block diagram of a computer system 10 which may utilize the present invention to provide a game port for furnishing signals representing real time operations to be utilized with application programs running on the computer system 10. A portion of such a system 10 includes a central processing unit (CPU) 11 which executes the various instructions provided to control the operations of the system 10. The central processing unit 11 is joined to a bus 12 adapted to carry information between the various components of the system 10. Typically the bus 12 used in a personal computer is an Industry Standard Association (ISA) bus although other buses such as a Peripheral Component Interconnect (PCI) or a VESA Local bus may be used. Joined to the bus 12 is main memory 13 which is typically constructed of dynamic random access memory arranged in a manner well known to those skilled in the prior art to store information during a period in which power is provided to the system 10.

Also connected to the bus 12 are various peripheral components such as long term memory 16 and circuitry such as graphics output circuitry 17 which may include a frame buffer to which data may be written which is to be transferred to an output device such as a monitor 18 for display. In various local bus systems such as a PCI bus system, main memory may actually be associated with the CPU 11 and the bus 12 through a bridge to a separate bus more closely associated the CPU 11; this allows memory accesses by the CPU 11 without the need to access the bus 12. A bus controller 15 controls access to the bus 12 by the various components joined thereto.

A bus master component 14 which may be one of many different peripheral components is also joined to the bus. The main properties of a bus master are that it includes a bus controller which functions at some internal clock rate and that it may initiate and control the transfer of data on the bus in a manner well known to those skilled in the art. In the present invention, the bus master 14 may conveniently include a direct memory access controller which is capable of writing directly to main memory and thereby relieving the CPU of the need to control transfer operations with the component 14. The bus master 14 may also be joined to receive signals from a game port circuit 27 designed in accordance with the present invention to which one or more joysticks may be connected. Alternatively, the game port circuit 27 of the present invention may be joined to the bus 12 through a bus slave circuit 19. Both connections are illustrated in FIG. 1 in order to assist in understanding the operation of the invention.

As is illustrated in FIG. 1, the game port circuit 27 receives input signals from a joystick circuit 28 which are to be utilized by an application program running on the central processing unit 11. The game port circuit includes registers 29 which are adapted to provide signals which indicate the operations of the joystick circuit 28. The bus master circuit 14 may include, among other things, a direct memory access (DMA) controller circuit 25. The DMA circuit 25 is designed to control the transfer of data on the bus 12 so that the CPU 11 may be relieved of conducting particular operations. DMA circuits are well known to those skilled in the prior art. A DMA is not necessary to the present invention but allows the computer system 10 to operate more rapidly than would be possible without it. More particularly, the DMA circuit 25 allows joystick position data generated by the game port circuit 27 and placed in the registers 29 to be written to the main memory 13 so that the CPU 11 need not be interrupted until data produced by a joystick and transferred to the game port 27 actually resides in main memory. As will be seen, this with the other aspects of the invention allows the game port monitoring normally conducted by the CPU 11 to be entirely offloaded from the CPU.

As pointed out above, the game port circuit 27 might function as a bus slave circuit were the DMA circuit not to be included. Such an arrangement may be illustrated by the connection of the circuit 27 to the bus slave circuit 19. With such an arrangement, an interrupt is sent to the central processing unit 11 using the facilities of the slave circuit 19. The central processing unit then reads the data in the registers 29 to obtain the position data necessary to the operation of the game application running on the central processing unit.

In contrast to the prior art game port circuits in which the output provided by the capacitor must be monitored by a software timing loop running on the CPU 11, the circuit 27 of the present invention provides all of the circuitry necessary to generate a signal representing joystick position movement as a part of the game port circuit 27. This relieves the CPU 11 of running a timing loop to monitor position changes by the joystick and allows the CPU to have all interrupts enabled so that games may run in a multitasking operating system.

To implement the present invention, the game port circuitry might be of several different types. An important factor is that the circuitry implement a method to measure a change in the value of a variable resistance and translate the value measured into a digital signal at the game port circuitry 27. It is useful if this includes hardware circuitry for determining the value of the variable resistor for each directional input signal of the joystick to directly replace the software run by the CPU to accomplish this purpose. Circuits for accomplishing all of these operations are well known to the prior art, and such circuits may be joined in the manner described to provide a direct output signal which represents the movement of the joystick in two of the four directions. This provides a signal at the game port circuit 27 which does not require constant monitoring by the CPU of the computer and thus allows the CPU to run without disabling interrupts. This allows the joystick to be used in a system running a multitasking operating system. In one of the embodiments illustrated in FIG. 1, the game port circuitry 27 is combined with DMA circuitry 25 for transferring the data stored for use by the CPU 11. In this embodiment, the CPU need not be involved until data indicative of joystick position is actually resident in main memory.

In one particularly inventive embodiment, capacitor timing circuitry is, in fact, included in the game port circuit 27 as part of hardware means for measuring the value of variable resistors which are a part of the joystick circuitry. This includes circuitry for providing a time period during which a capacitor charges and circuitry for furnishing the timing period as a digital signal which is a direct measurement of the change in resistance of the variable resistors of the joystick. The game port circuit 27 may also include circuitry which provides backward compatibility so that application programs which must utilize a timing loop run by the CPU may be accommodated.

Figure 2:
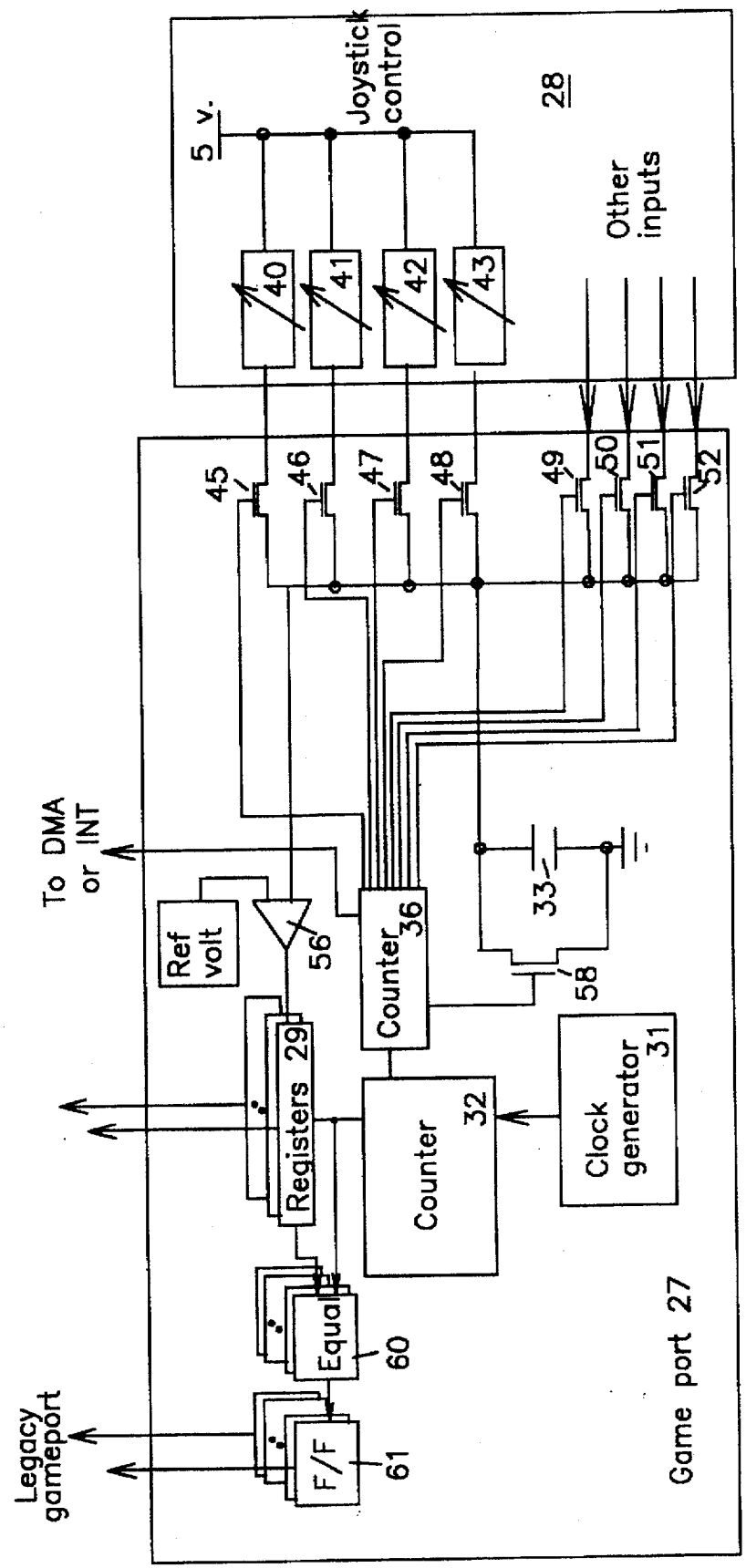
FIG. 2 is a block diagram illustrating one embodiment of a game port circuit such as that illustrated in FIG. 1 which is designed in accordance with the present invention and may receive input signals from an associated joystick used to play computer games.

In the embodiment shown in FIG. 2, the game port circuitry 27 includes a clock generator circuit 31 which provides an output to run a counter circuit 32. The counter circuit 32 counts from a zero value for a number of cycles once its operation is initiated until it reaches an upper limit at which it overflows and recycles to zero. At any instant, the counter circuit 32 produces an output value which indicates the length of time it has counted from zero. A single capacitor 33 receives an input current provided across one of the variable resistances 40–43 of a joystick 28. The particular one of the resistances 40–43 is determined by a channel enable signal applied to one of a number of transistor switches 45–52. When the capacitor 33 charges to a value equal to a reference voltage 54, a signal is produced by a comparator circuit 56. The signal from the comparator circuit 56 enables one of eight registers 29 which latches the present value produced by the counter circuit 32. If the counter circuit 32 begins counting when the capacitor begins charging, this value is a direct measurement of the time required to charge the capacitor to the reference voltage and a direct measurement of the value of the resistance being measured.

In order to assure that the count of the counter circuit 32 starts at the same time as the capacitor begins charging, the point at which the counter circuit 32 overflows and goes to zero is used to first initiate a discharge of the capacitor 33 by closing a transistor switch 58 across the capacitor for an instant and thereafter to enable one of the channel enable transistor devices 45–48. This causes the capacitor 33 to be discharged and a new charging period to begin as the counter circuit 32 is zeroed.

In order to select one of the channel enable transistors 45–52, a second counter circuit 36 is included. This counter circuit 36 receives an input signal whenever the counter circuit 32 overflows. Each time the counter circuit 36 receives an input signal, the counter circuit 36 provides a signal which enables one of the transistors 45–52 determined by the particular count which the counter circuit 36 holds. In this manner, the different variable resistor values (and the on/off values provided at the other binary inputs from the joystick 28) are ascertained in serial order using the single capacitor 33. These values are stored in one of eight individual registers 29 associated with the particular enable channel transistor 45–52. This is to be contrasted with the prior art game port circuits which ascertain values in parallel and thus require individual capacitors for each of the variable resistors. In fact, the single capacitor 33 is the only individual components necessary to the game port 27 of the present invention. Apart from the capacitor 33, the entire game port circuit 27 may be a single integrated circuit. In fact, the capacitor 33 may easily be integrated with the other circuit elements in a particular embodiment.

Reviewing the operation of the game port circuit 27, initially a signal is provided to enable the transistor device 58 and thereby discharge the capacitor 33. Then, the counter circuit 32 begins counting from zero and one of the channel enable transistors is selected. Presuming the selected channel is joined to one of the variable resistors 40–43, the position of the joystick causes the resistance to have a certain value. The comparator circuit 56 allows the counting circuit 32 to count the number of cycles provided by the clock circuit 31 until the capacitor 33 is charged to the reference voltage and then provides an output signal to latch the value of the counter circuit 32 at that instant in the register 29 associated with the particular channel enable transistor. The count by the counting circuit 32 continues until the circuit overflows producing a count signal for the counter circuit 36. The value counted by the counting circuit 36 selects the next channel enable transistor 45–52, enables the discharge transistor device 58, and then allows charging of the capacitor 33 to recommence to measure the new variable resistor value. This value is measured in the same way and is transferred to an associated one of the registers 29.

The values placed in the registers 29 may be transferred to the CPU 11 in any of a number of ways. The output signals may be stored in the registers 29 of the game port circuit 27, and an interrupt may be generated by the termination of the operation by the counting circuit 36 sent to the CPU 11 using the facilities of the bus slave circuit 19 so that the CPU 11 may read the joystick position data from the registers 29. Since this requires a read operation by the CPU, it is a relatively slow operation in advanced X86 based computers.

In another embodiment, after all of the values of the variable resistors and the binary inputs are captured into the registers 29 as determined by the overflow of the counting circuit 36, a signal may cause the initiation of an operation by the DMA 25 to transfer the value stored in the register 29 to a particular address in main memory 13. The DMA 25 is signaled that data is available in the registers 29. The DMA 25 asserts a signal in a normal manner to obtain control of the bus 12 and transfers the data to main memory 13. At the end of the transfer by the DMA 25, the DMA 25 may generate an interrupt to alert the CPU 11 that values are available for its use at the particular addresses in main memory 13. This second embodiment is especially useful in systems in which the bus topology is weighted in favor of write operations and read operations by the CPU 11 are very slow (e.g., a PCI or other write buffered local bus). As may be seen, this last method of operation essentially eliminates any need for the CPU 11 to be involved in the process of obtaining the position data from the port representing the joystick position.

Because the CPU 11 does not have to be used to monitor the game ports, the game port may be used with game programs and other application programs which make extensive use of the game port without tying up the CPU 11 in timing operations at the game port. Because of this, the system need not have interrupts disabled while the timing loops are being run. This allows the applications using the game port to be run in multi-tasking operating systems without interfering with the operation of other programs. This also allows the applications using the game port to utilize the CPU 11 much more efficiently for providing other operations of the application such as drawing graphics and the like.

Because the embodiment illustrated in FIG. 2 utilizes a single capacitor rather than the large number of passive components used by prior art circuits and measures variations in resistances by a serial hardware process rather than in parallel, a method of handling prior art software applications must be provided. The present invention utilizes the game port circuitry described above to furnish in parallel output signals which may be used by a CPU timing loop to determine the values of variable resistors 40-43. In order to be able to do this, a comparator circuit 60 is provided for each variable resistor to be measured. The output of each comparator circuit 60 is provided to one of a plurality of flip-flop circuits 61. Once values have been ascertained for the variable resistors and stored in the registers 29, an inquiry through the bus slave circuit 19 by the CPU running a CPU timing loop process in an older application causes the output of the counter circuit 32 to be measured by each comparator 60 against the value stored in the associated register 29. The CPU timing program begins as the counter circuit 32 is zeroed and the flip-flops 61 are set to a first state. Each comparator 60 provides an output signal to set the associated flip-flop 61 to its other state when the value in its associated register 29 is reached. Consequently, each flip-flop 61 provides a signal to the CPU at a point in the timing loop being run by the CPU which indicates the length of time the loop has been running for that resistance value. This causes all of the timing loop values to be provided to the CPU in parallel while using only the single capacitor of the game port circuit 27. In this manner, the game port circuit of the present invention may be made to provide both advanced position value measurements which do not tie up the CPU and measurements which may be utilized by older software application programs.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer comprising:
 a central processing unit;
 a bus;
 main memory; and
 a game port circuit comprising
  a plurality of circuits each for generating an analog signal indicative of a directional movement of a joystick or similar input device,
  a circuit for translating the analog signals generated by the plurality of circuits to digital signal values indicating position, including
   a plurality of registers to capture the digital signal values indicating position,
   a counting circuit to determine when said digital signal values are captured and to generate a first signal for indicating to the central processing unit that digital signal values from the game port are available for use at a particular address.

2. A computer as claimed in claim 1 further comprising a direct memory access controller for transferring digital signal values from the game port to main memory, and in which the counting circuit generates a second signal when said digital signal values are captured to cause the direct memory access controller to obtain control of the bus and transfer the digital signals values to the particular address in main memory.

3. A computer as claimed in claim 1 in which the circuit for translating the analog signals generated by the plurality of circuits to digital signal values indicating position comprises a capacitor,
 a plurality of circuits for providing charging currents representing a position of a joystick,
 a switching circuit for connecting one of the plurality of circuits for providing charging currents representing a position of a joystick to charge the capacitor when the counting circuit begins counting,
 a source of a reference voltage,
 a comparator joined to compare a capacitor voltage with the reference voltage and provide an output signal, and
 a register for latching a value in the counting circuit in response to the output signal.

4. A computer as claimed in claim 3 further comprising:
 a plurality of additional comparators each joined to compare a counter value to a value latched in one of the plurality of registers, and
 a plurality of circuits for providing timing loop indications to the central processing unit in response to the condition of the additional comparators.

5. A computer as claimed in claim 1 in which the counting circuit for indicating to the central processoring unit comprises means for generating an interrupt indicating to the central processoring unit that digital signal values are stored at the particular address in registers of the game port circuit.

6. A computer comprising
 a central processing unit;
 a system bus;
 main memory; and
 a game port circuit comprising:
  a plurality of circuits each for generating an analog signal indicative of a directional movement of a joystick or similar input device,
  a circuit for translating the analog signals generated by the plurality of circuits to digital signals indicating position comprising:
   a first counter circuit,
   a capacitor,
   a plurality of circuits for providing charging currents representing a position of a joystick,
   a switching circuit for connecting one of the plurality of circuits for providing charging currents representing a position of a joystick to charge the capacitor when the counter circuit begins counting, the switching circuit comprising:
    a second counter circuit joined to receive an input signal when the first counter circuit overflows and produce an output signal,
    a plurality of switches for connecting one of the plurality of circuits for providing charging currents representing a position of a joystick to charge the capacitor, and
    a capacitor discharge circuit responding to an output signal from the second counter circuit,
   a source of a reference voltage,
   a comparator joined to compare a capacitor voltage with the reference voltage and provide an output signal, and
   a register for latching a value in the counter circuit in response to the output signal, and
   circuitry for indicating to the central processing unit that digital signals from the game port are available for use.

7. A game port circuit comprising:
 a plurality of circuits each for generating an analog signal indicative of a directional movement of a joystick or similar input device, a circuit for translating the analog signals generated by the plurality of circuits to digital signal values indicating position, including a plurality of registers to capture the digital signal values indicating position, and a counting circuit to determine when said digital signal values are captured and to generate a first signal to indicate to a central processing unit that digital signal values from the game port are available for use at a particular address.

8. A game port circuit as claimed in claim 7 further comprising a direct memory access controller for transferring digital signal values form the game port to main memory of a computer system, and in which the counting circuit generates a second signal when said digital signal values are captured to cause the direct memory access controller to obtain control of the bus and transfer the digital signal values to the particular address in main memory.

9. A game port circuit as claimed in claim 7 in which the circuit for translating the analog signal generated by the plurality of circuits to digital values indicating position comprises a capacitor, a plurality of circuits for providing charging currents representing a position of a joystick, a switching circuit for connecting one of the plurality of circuits for providing charging currents representing a position of a joystick to charge the capacitor when the counting circuit begins counting, a source of a reference voltage, a comparator joined to compare a capacitor voltage with the reference voltage and provide an output signal, and a register for latching a value in the counter circuit in response to the output signal.

10. A game port circuit as claimed in claim 9 further comprising:

a plurality of additional comparators each joined to compare a counter value to a value latched in one of the plurality of registers, and a plurality of circuits for providing timing loop indications to the central processing unit in response to the condition of the additional comparators.

11. A game port circuit as claimed in claim 7 in which the counting circuit for indicating to the central processoring unit comprises means for generating an interrupt indicating to the central processoring unit that digital signal values are stored at the particular address in registers of the game port circuit.

12. A game port circuit comprising a plurality of circuits each for generating an analog signal indicative of a directional movement of a joystick or similar input device;

a circuit for translating the analog signals generated by the plurality of circuits to digital signals indicating position comprising:

a first counter circuit, a capacitor, a plurality of circuits for providing charging currents representing a position of a joystick, a switching circuit for connecting one of the plurality of circuits for providing charging currents representing a position of a joystick to charge the capacitor when the counter circuit begins counting, the switching circuit comprising:

a second counter circuit joined to receive an input signal when the first counter circuit overflows and produce an output signal, a plurality of switches for connecting one of the plurality of circuits for providing charging currents representing a position of a joystick to charge the capacitor, and a capacitor discharge circuit responding to an output signal from the second counter circuit, a source of a reference voltage, a comparator joined to compare a capacitor voltage with the reference voltage and provide an output signal, and a register for latching a value in the counter circuit is response to the output signal; and circuitry for providing a signal to indicate that digital signals from the game port are available for use.

* * * * *